Dec. 27, 1966　　　　　　　E. L. WITCHIE　　　　　　　3,295,120
TEMPERATURE MONITOR
Filed Jan. 16, 1964　　　　　　　　　　　　　　　2 Sheets-Sheet 1
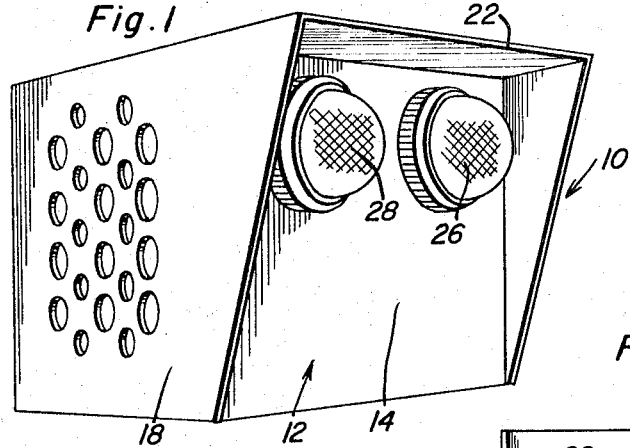
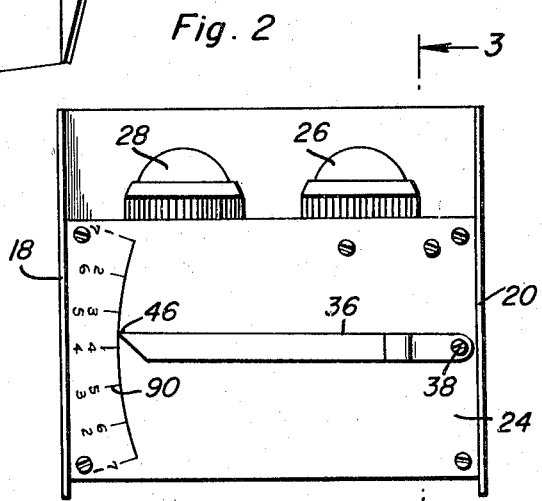
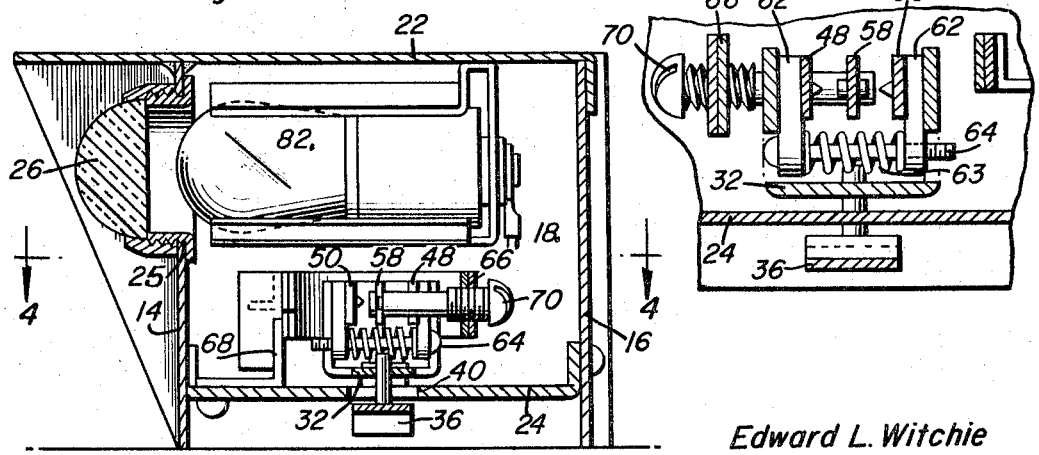
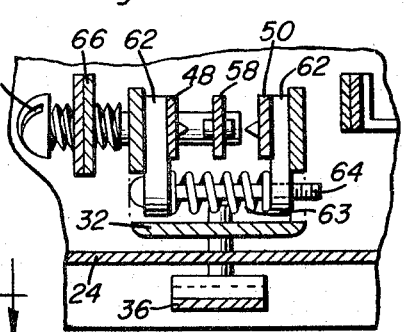
Edward L. Witchie
INVENTOR.
BY *Clarence A. O'Brien*
*and Harvey B. Jacobson*
Attorneys Edward L. Witchie
INVENTOR.

United States Patent Office 3,295,120
Patented Dec. 27, 1966

3,295,120
TEMPERATURE MONITOR
Edward L. Witchie, R.F.D. 4, (Salem),
Colchester, Conn. 06415
Filed Jan. 16, 1964, Ser. No. 338,199
8 Claims. (Cl. 340—227)

The temperature monitor of the instant invention is designed primarily for use in homes, schools or buildings where, for periods of time, there is no one present. During these times it is possible to have a power failure or a malfunction in the heating or air conditioning system, and the temperature monitor of the instant invention includes means by which a signal is given if the temperature of the ambient atmosphere rises above a predetermined high temperature setting or drops below a predetermined low setting.

The temperature monitor of the instant invention comprises a switch assembly that is adapted to alternately electrically actuate first and second electrical circuits in response to a rise and fall in the ambient tempertaure. The switch means includes spaced first and second contacts which are mounted for oscillation toward and away from each other and means is provided for adjustably varying the spacing between the contacts. In addition, terminal means is mounted between the contacts and for oscillation in the plane of movement of the contacts with heat responsive means being connected to the terminal means for oscillating the latter in response to a rise and fall in the ambient temperature. The switch monitor further includes means by which the contacts may be simultaneously and equally shifted relative to the terminal and additional means whereby the position of the terminal means relative to the contact means at any given temperature may be varied. In this manner, electrical signal means may be electrically connected to the contacts and the terminal disposed therebetween for actuation of the signal means upon contact of the terminal with either of the contacts, it being understood that the two electrical circuits would be electrically connected to a suitable source of electrical potential.

By varying the spacing between the spaced contacts the amount of change in temperature required to shift the terminal from one contact to the other may be varied and by simultaneously shifting the contacts relative to the terminal the temperature range defined between the terminals may be raised and lowered. Still further, by shifting the terminal relative to the contacts it is possible to raise and lower the aforementioned temperature range without otherwise varying the operation of the switch means.

The main object of this invention is to provide a temperature monitor which will be capable of signalling when predetermined minimum and maxium temperatures are reached.

Still another object of this invention is to provide a temperature monitor including means by which the number of degrees between the minimum and maximum temperature settings of the monitor may be varied.

Still another object of this invention is to provide a means whereby the temperature setting for actuation of one or both of the signal means may be adjusted independently of adjustment of the number of degrees between the minimum and maximum temperatures for actuating the signal means.

A final object of this invention, in accordance with the preceding objects, is to provide a temperature monitor in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the temperature monitor of the instant invention;

FIGURE 2 is a bottom plan view of the temperature monitor;

FIGURE 3 is an enlarged vertical sectional view taken substantially upon the plane indicated by the section line 3—3 of FIGURE 2;

FIGURE 6 is a fragmentary enlarged vertical sectional view taken substantially upon the plane indicated by the section line 6—6 of FIGURE 5.

Figure 4:
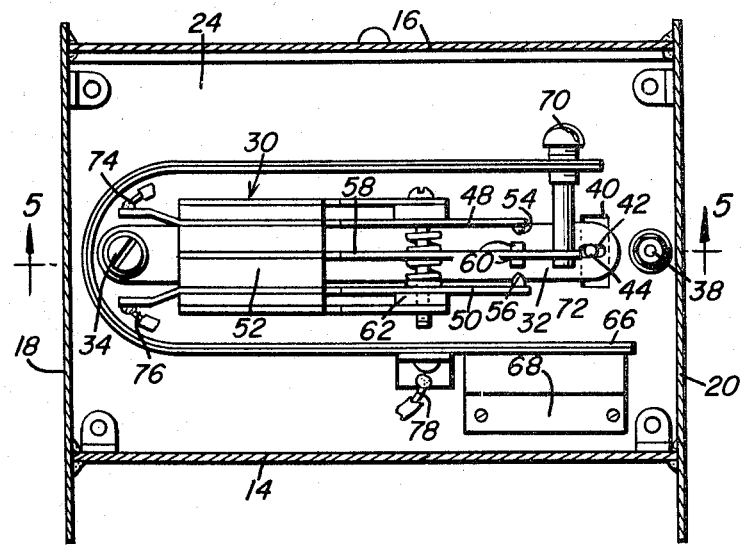
FIGURE 4 is a horizontal sectional view taken substantially upon the plane indicated by the section line 4—4 of FIGURE 3.
Figure 5:
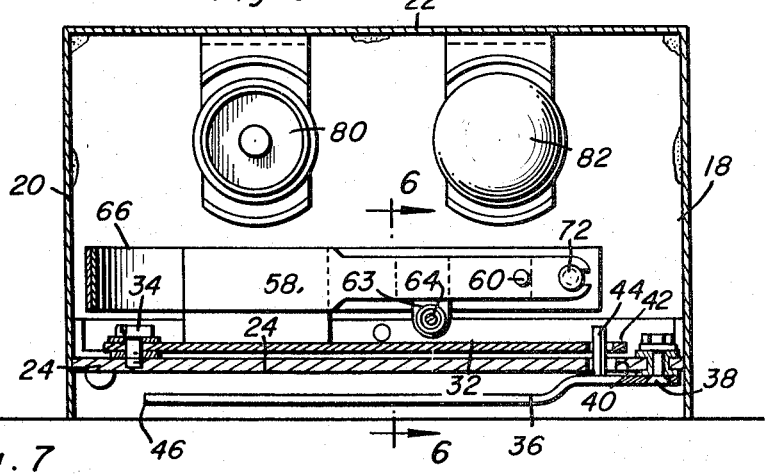
FIGURE 5 is a vertical sectional view taken substantially upon the plane indicated by the section line 5—5 of FIGURE 4.

Referring now more specifically to the drawings the numeral 10 generally designates the temperature monitor of the instant invention which includes a housing generally referred to by the reference numeral 12. The housing 12 includes front and rear walls 14 and 16 interconnected by means of a pair of opposite side wall 18 and 20 and top and bottom walls 22 and 24. The bottom wall 24 comprises a base and it may be seen that the front wall 14 has a pair of openings 25 formed therein in which a pair of colored lenses 26 and 28 are secured.

A switch assembly generally referred to by the reference numeral 30 is mounted on a support arm 32 which has one end pivotally secured to the base 24 by means of a pivot fastener 34. The support arm 32 is disposed within the housing 12 and a lever arm 36, which generally parallels the support arm 32 has one end thereof pivotally secured to the undersurface of the bottom wall or base 24 by means of a pivot fastener 38. The bottom wall 24 has a slot 40 formed therein above which the free end of the support arm 32 is disposed. The free end of the support arm 32 also has a slot formed therein which is designated by the reference numeral 42 and which is in vertical alignment with the slot 40. The lever arm 36 and the support arm 32 are disposed in vertically spaced side-by-side relation and the opposite ends of the arms 32 and 36 are pivotally secured to the bottom wall 24. The lever arm 36 includes an upstanding pin 44 which is received through the slot 40 and also through the slot 42. From FIGURE 4 of the drawings it may be seen that the slots 40 and 42 are disposed in vertical planes disposed at right angles relative to each other and that pivotal movement of the pointed end 46 of the lever arm 36 will effect greatly reduced swinging movement of the free slotted end of the support arm 32.

The switch assembly 30 includes a pair of generally parallel resilient contact arms 48 and 50 which are insulatively supported at one pair of corresponding ends from the pivoted end of the support arm 32 by means of insulative material 52. The free ends of the contact arms 48 and 50 include opposing contacts 54 and 56 and a third terminal arm 58 generally paralleling and disposed between the contact arms 48 and 50 also has one end supported by the insulative material 52. The free end portion of the terminal arm 58 is provided with a pair of terminals 60 which are adapted for electrical contact with the contacts 54 and 56.

The free end portions of the contact arms 48 and 50 each has an insulated block 62 secured thereto and it will be noted from FIGURES 3 and 6 of the drawings that the insulative blocks 62 project downwardly below the contact arms 48 and 50 and have a compression spring 63 disposed therebetween with a fastener 64 passing through the coil spring 63, one of the insulative blocks 62 and being threadedly engaged in the other insulative block 62. In this manner, the compression spring 63 yieldingly urges the free ends of the contact arms 48 and 50 away from each other and the fastener 64 adjustably limits movement of the free ends of the contact arms 48 and 50 away from each other.

One end of a U-shaped bimetallic strip 66 is secured to the bottom wall 24 by means of a bracket 68 and the free end of the U-shaped bimetallic strip 66 has a fastener 70 threadedly disposed therethrough, one end of the fastener 70 being journaled through the free end of the terminal arm 58 as at 72 with the free end of the terminal arm 58 being engaged by the fastener 70 in a manner to prevent shifting of the free end of the terminal arm 58 axially of the fastener 70.

Figure 7:
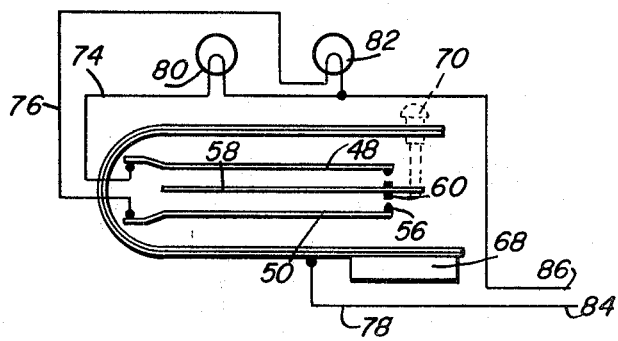
FIGURE 7 is a diagrammatical view of the electrical circuits of the temperature monitor.

First and second conductor means 74 and 76 are electrically connected to the contact arms 48 and 50 and a third conductor means 78 is electrically connected to the terminal arm 58 by means of the bimetallic strip 66 and the fastener 70. From FIGURE 7 of the drawings it may be seen that first and second electric signal means in the form of incandescent lamps 80 and 82 may be serially connected in the conductor means 74 and 76 and that the free ends 84 and 86 of the conductor means 78 and 74 are adapted for electrical connection with a suitable source of electrical potential.

In operation, the lever arm 36 may be pivoted so as to bring the pointed end 46 thereof in registry with the indicia 90 on the undersurface of the bottom wall 24. The adjustment of the lever arm 36 simultaneously varies the positioning of the contacts 54 and 56 relative to the terminal 60 without varying the spacing between the contacts 54 and 56. Thus, the operating temperature range of the temperature monitor 10 may be adjusted by manipulation of the lever arm 36.

If it is desired to increase or decrease the temperature range defined between the contacts 54 and 56, the adjusting screw or fastener 64 may be turned as desired. Still further, after adjusting the lever arm 36, the adjusting screw or fastener 70 may be adjusted so as to vary the initial positioning of the terminals relative to the contacts 54 and 56. In operation, the lenses 26 and 28 may be of a different color and the lens for the incandescent lamp 80 may be red in color while the lens for the incandescent lamp 82 may be green in color. The adjusting screw 70 may be adjusted so as to have the green light operating at all times when the temperature is either above or below predetermined minimum or maximum temperatures respectively. The red lens for the lamp 80 would then indicate when the temperature has risen above or below predetermined maximum or minimum temperatures respectively. Of course, any suitable colored lenses may be utilized and may be reversed in position if desired so as to render the desired signal in response to a given temperature condition.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. A temperature responsive switch comprising base means, a support arm pivotally secured at one end to said base means for adjustable swinging movement of the other end of said arm about an axis extending transversely of said support arm and through a first plane, a pair of generally parallel resilient contact arms insulatively supported at one pair of corresponding ends from said support arm, means insulatively connected between the free ends of said contact arms adjustably varying the spacing between said free ends, an elongated resilient terminal arm generally paralleling and disposed between said contact arms and insulatively supported, at the end thereof corresponding to said one pair of ends, from said support arm, opposing terminals and contacts on the free ends of said terminal and contact arms respectively adapted to engage each other upon movement of the free end of said terminal arm toward said contacts, and movable heat responsive actuating means oscillatable, in response to a rise and fall of the ambient temperature, in the plane containing the free ends of said terminal and contact arms and connected to said terminal arm, and first and second electrical conductor means electrically connected to said contact arms and third electrical conductor means electrically connected to said terminal arm.

2. The combination of claim 1 wherein said means insulatively connected between the free ends of said contact arms includes means yieldingly urging the free ends of said contact arms away from each other, and means adjustably defining a limit of movement of the free ends of said contact arms away from each other.

3. The combination of claim 1 including means operatively connected between said base and the free end of said support arm for adjustably rotating the latter.

4. A temperature responsive switch comprising base means, a support arm pivotally secured at one end to said base means for rotation about an axis extending transversely of said support arm and swinging movement through a first plane, a pair of generally parallel resilient contact arms insulatively supported at one pair of corresponding ends from said support arm, means insulatively connected between the free ends of said contact arms adjustably varying the spacing between said free ends, an elongated resilient terminal arm generally paralleling and disposed between said contact arms and insulatively supported, at the end thereof corresponding to said one pair of ends, from said support arm, opposing terminals and contacts on said terminal and contact arms respectively adapted to engage each other upon movement of the free end of said terminal arms toward said contacts, and movable heat responsive actuating means oscillatable, in response to a rise and fall of the ambient temperature, in the plane containing the free ends of said terminal and contact arms and connected to said terminal arm, and first and second electrical conductor means electrically connected to said contact arms and third electrical conductor means electrically connected to said terminal arm, means operatively connected between said base and the free end of said support arm for adjustably rotating the latter, the last-mentioned means comprising a lever arm generally paralleling and disposed in side-by-side relation to said support arm and pivotally secured, at the end thereof corresponding to the free end of said support arm, to said base means for rotation about an axis generally paralleling the axis of rotation of said support arm and adapted at its free end to be manually engaged for pivoting said lever arm, and means defining a pin and slot connection between the free end of said support arm and the pivoted end of said lever arm for effecting slight pivotal movement of said support arm in response to greater pivotal movement of said lever arm.

5. The combination of claim 1 including a pair of electric signal means serially connected in said first and second conductor means, said first and second conductor means and said third conductor means being adapted to be electrically connected to a suitable source of electrical potential.

6. Switch means adapted to alternately electrically actuate first and second electrical circuits in response to a rise and fall in the ambient temperature, said switch means including base means, support means mounted on said base for oscillation relative thereto along a predetermined path and stationary adjustment along said path, spaced first and second contacts mounted on said support means for movement therewith and also toward and away from each other relative to said support means along paths generally paralleling said path, means insulatively connected between said contacts for adjustably varying the spacing therebetween, terminal means supported from said base and between said contacts for oscillation along a path generally paralleling the paths movement of said contacts toward and away from the latter, heat responsive actuating means supported from said base and operatively connected to said terminal means for oscillating the latter in response to a rise and fall in the ambient temperature.

7. The combination of claim 6 including means connected between said terminal means and said actuating means operable to adjustably shift said terminal means, in its path of oscillation, relative to said actuating means.

8. The combination of claim 1 including means connected between the free end of said terminal arm and said actuating means operable to adjustably shift said terminal means, in its path of oscillation, relative to said actuating means.

References Cited by the Examiner

UNITED STATES PATENTS

| | | | |
|---|---|---|---|
| 661,731 | 11/1900 | Callum | 340—227 |
| 2,021,440 | 11/1935 | Wheeler et al. | 200—139 |
| 2,162,296 | 6/1939 | Chappel | 200—139 |
| 2,448,776 | 9/1948 | Crise | 340—227 |

NEIL C. READ, *Primary Examiner.*

D. YUSKO, *Assistant Examiner.*